March 22, 1960  T. A. BANK  2,929,231
FLEXIBLE COUPLING
Filed July 23, 1956  3 Sheets-Sheet 1

INVENTOR
THOMAS A. BANK
BY W. A. Fraser
ATTORNEY

March 22, 1960

T. A. BANK 2,929,231

FLEXIBLE COUPLING

Filed July 23, 1956

INVENTOR
THOMAS A-BANK

BY  W. A. Fraser

ATTORNEY

March 22, 1960

T. A. BANK 2,929,231

FLEXIBLE COUPLING

Filed July 23, 1956

INVENTOR
THOMAS A. BANK

BY W. A. Fraser

ATTORNEY

United States Patent Office 2,929,231
Patented Mar. 22, 1960

2,929,231

FLEXIBLE COUPLING

Thomas A. Bank, Indianapolis, Ind., assignor to The Firestone Tire & Rubber Company, Akron, Ohio, a corporation of Ohio Application July 23, 1956, Serial No. 599,547

7 Claims. (Cl. 64—11)

This invention relates to torque-transmitting couplings and, more particularly, to couplings wherein torque is transmitted through a flexible element.

In many machines, it is desirable to vary the alignment of shafts and the like in power trains transmitting rotary motion from a prime mover to a final point of output, thus requiring flexible couplings. The driving and driven members on opposite sides of such couplings may be displaced angularly, radially, or longitudinally with respect to each other. In many instances, it is not only desirable that such couplings be sufficiently flexible to compensate for the misalignment but also that they transmit the rotation with a minimum of noise and without transmitting any appreciable vibration or high stress peaks.

Certain prior art couplings have embodied a solid resilient element to transmit torque and to compensate for the misalignment of the input and output shafts. Such couplings are not adequate for heavy-duty apparatus because when high torque is transmitted the resilient member must be relatively thick to withstand the high stresses involved. Therefore, flexibility is sacrificed. In certain other prior art devices, the torque has been transmitted through a hollow, flexible element having walls sufficiently thin to provide the required degree of flexibility but insufficiently supported internally. Such devices have tended to collapse and even rupture under high torque.

To overcome the disadvantages of the prior art, it is a primary object of this invention to provide a substantially noise-free coupling capable of flexibly transmitting high torque with a minimum of vibration and stress transfer.

It is an additional object of this invention to provide a flexible coupling having a hollow flexible element internally supported by a substantially incompressible fluid in position to transmit high torque through torsional stress of the flexible element.

It is a further object of this invention to provide a flexible coupling having a resilient tubular element internally supported by a substantially incompressible fluid in position to transmit high torque through torsional stress of the resilient element and means to restrict the exterior diameter of the element intermediate the ends thereof.

It is a still further object of this invention to provide a flexible coupling having a hollow flexible element internally supported by a substantially incompressible fluid between driving and driven members in position to transmit high torque through torsional stress of the flexible element wherein relative radial and angular displacement of the members is permitted while relative longitudinal displacement thereof is prevented.

It is an additional object of this invention to provide a flexible coupling having a hollow flexible element internally supported by a substantially incompressible fluid between driving and driven members in position to transmit high torque through torsional stress of the flexible element wherein relative angular displacement of the members is permitted while relative radial displacement thereof is prevented Broadly stated, the invention consists of a flexible torque-transmitting coupling comprising a driving member, a driven member, a hollow flexible element connecting the members to provide a chanmber between the members and to transmit torque therebetween through torsional stress of the flexible element and a substantially incompressible fluid material substantially completely filling the chamber and supporting the flexible element while the members are rotating and the flexible element is transmitting torque therebetween.

The stated objects and others will be apparent from the specific embodiments of the invention completely described hereinafter and shown in the drawings in which.

Figure 7:
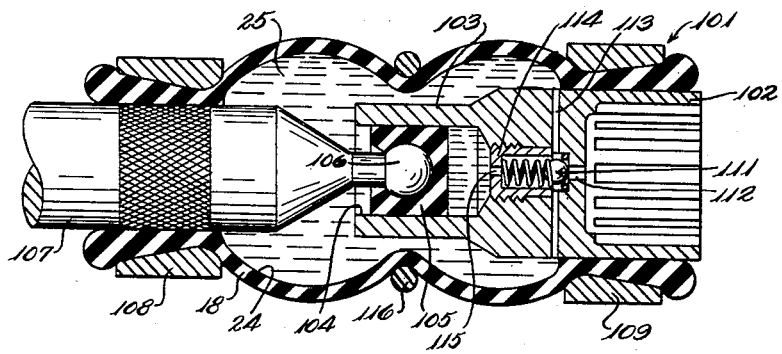
Figure 8:
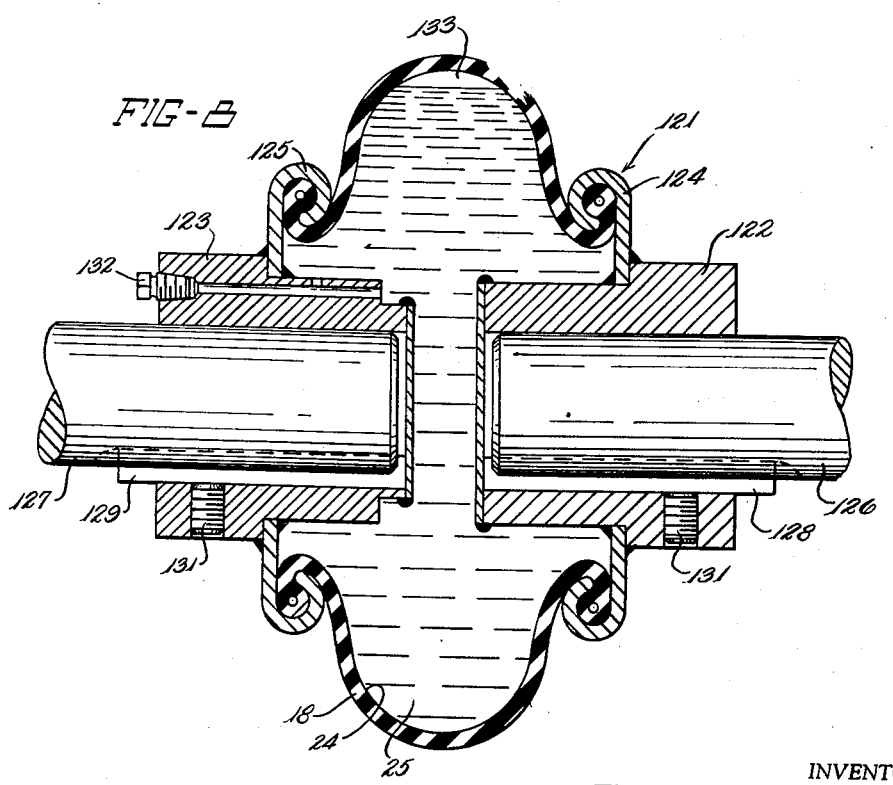

Figure 7 is still an additional modified form of the flexible coupling of the invention wherein the driving and driven members on opposite sides of the flexible element are axially connected to permit relative angular and longitudinal movement of the members while preventing relative radial displacement thereof and wherein a non-resilient ring extends peripherally around the flexible element to limit the diameter intermediate the ends thereof; and Figure 8 is still another modified form of the flexible coupling of the invention as applied to an air spring.

Figure 1:
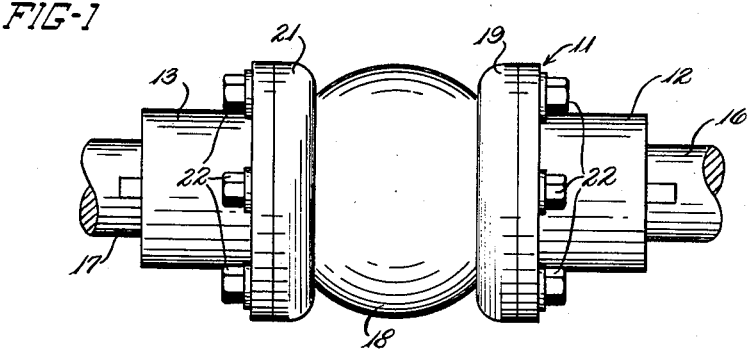
Figure 1 is a view in front elevation showing the flexible coupling of the invention.
Figure 2:
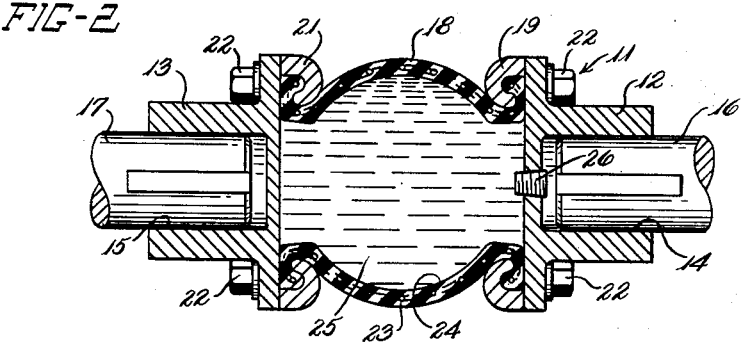
Figure 2 is a vertical sectional view showing the coupling of Figure 1.

As shown in Figures 1 and 2, there is provided a flexible coupling designated generally by the reference numeral 11. The coupling includes an input or driving member 12 and an output or driven member 13 which have shaft-receiving openings 14 and 15 respectively for the splined connection of input shaft 16 and output shaft 17. Extending between the members 12 and 13 is a generally tubular flexible element 18 securely fastened by means of hooked end fastenings 19 and 21 which are connected to the members 12 and 13 respectively by means of bolts 22 to form fluid-tight connections. A preferred material for the flexible element 18 is rubber. It will be understood, however, that any one of a number of materials may be utilized including the various synthetic rubbers, flexible plastics, leather and the like. To impart greater strength to the flexible element 18, particularly where a resilient material is used, there may be embedded therein a reinforcing fabric 23 which consists of a plurality of cords or strands extending from end to end of the flexible element in diagonally crossing relationship. The major portion of the torque is transmitted through the diagonal cord segments. Crossing cord segments are provided in order that torque may be transmitted in either direction of rotation. It is understood that the reinforcing fabric is schematically set forth in Figure 2 only to the extent necessary for an adequate understanding of its construction and function. It is further understood that any other suitable type of reinforcing fabric may be used.

The flexible element 18 connecting driving member 12 and driven member 13 provides a chamber 24 between these members which is substantially completely filled with an incompressible fluid 25 which provides internal support for the flexible element during the rotation of the driving and driven members. The term "substantially incompressible fluid material" as used herein is not restricted to a Newtonian material but includes any flowable material which will provide firm internal support for the flexible element of the coupling of the invention without appreciably restricting the ability of the element to flex. A preferred material is a liquid of any type which is economical, readily available and non-corrosive to the other materials of the flexible coupling including, without limitation, water, oil and the like. However, a semi-solid material such as a grease or even an incompressible powder might be used. A removable filling plug 26 is situated in the wall of the driving member 12 to permit the chamber 24 to be filled with the fluid material 25. It will be understood that the filling plug may be situated in either the driving or the driven member or in the wall of the flexible element 18 as desired.

Various modified forms of the invention will be described hereinafter in detail sufficient only to set forth the differences between them and to enable their complete understanding. In all of the embodiments, like parts have been assigned the same reference numerals.

Figure 3:
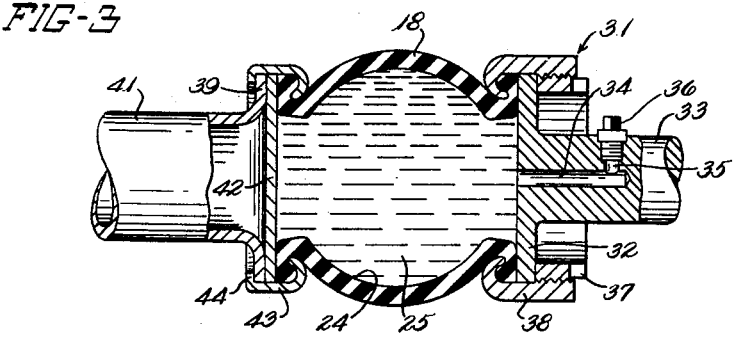
Figure 3 is a vertical sectional view showing the flexible coupling of the invention with modified end-fastening devices for the flexible element.

The flexible coupling designated generally by the reference numeral 31 and shown in Figure 3 is a slightly modified form of the coupling illustrated in Figure 2. This embodiment illustrates alternative end fastenings for the flexible element 18. In this instance, the driving member 32 is an integral part of the end portion of input shaft 33 which has an axial bore 34 and a lateral bore 35 adapted to receive a filling plug 36. Extending peripherally around the end member 32 is a threaded sleeve 37 to which is threadedly attached hooked end fastening 38 which tightly engages and holds the end of flexible element 18. The driven member comprises a flange 39 of hollow output shaft 41 covered by end plate 42. The flexible element 18 is securely attached to the driven member by means of hooked end fastening 43 which is secured to the driven member by means of flange 44 bent thereover.

Figure 6:
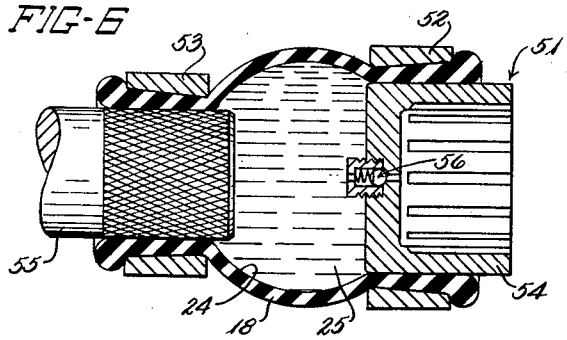
Figure 6 is an additional modification of the flexible coupling of the invention showing another form of end fastening device for the flexible element.

Another modified form of end fastening is embodied in the flexible coupling 51 illustrated in Figure 6 wherein wedge-shaped sleeves 52 and 53 clamp the flexible element 18 against knurled input shaft 54 and output shaft 55. In this instance, the ends of the shafts 54 and 55 constitute the driving and driven members between which torque is transmitted by the flexible element 18. The chamber 24 is filled with incompressible fluid 25 through spring-biased, ball-type check valve assembly 56.

While relative angular displacement of the driving and driven members on opposite sides of the flexible element 18 of the couplings shown in Figures 2, 3 and 6 is feasible, the devices shown in these figures are primarily designed to transmit torque between shafts which are parallel but which may or may not be displaced radially relative to one another.

Figure 4:
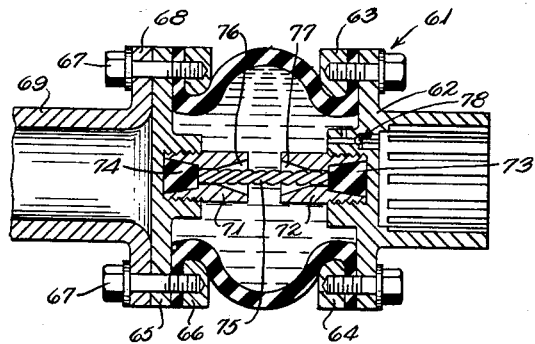
Figure 4 is a further modified form of the flexible coupling of the invention wherein the driving and driven members on opposite sides of the flexible element are axially connected in such a manner as to permit relative angular and radial displacement of the members while preventing relative longitudinal displacement thereof.

A further modified form of flexible coupling designated generally by the reference numeral 61 is illustrated in Figure 4. In this instance, the splined shaft-receiving driven member 62 is attached to the flexible element 18 by means of hooked end fastenings 63 and 64. The driven member 65 is connected to the flexible element 18 by means of hooked end fastenings 66 and bolts 67 which also extend through outwardly turned flange 68 of hollow output shaft 69. Threadedly engaging the ends of driving member 62 and driven member 65 at the axis of rotation thereof are plugs 71 and 72 which are provided with base cavities containing resilient inserts 73 and 74 which in turn form end anchorages for the twisted wire connector member 75 embedded therein and extending along the axis of rotation of the driving and driven members. If desired, an enlarged end member such as a washer may be fixed to each end of the connector member 75 to insure a stronger connection to the resilient inserts 73 and 74. By virtue of this construction, relative angular and radial displacement of the driving and driven members 62 and 65 is permitted, but relative longitudinal movement thereof is prevented. To facilitate this radial and angular displacement, the inner ends of the plugs 71 and 72 have conical recesses 76 and 77 formed therein. The connector member may be rigid and thus prohibit longitudinal displacement of the driving and driven members in either direction or flexible and thus prohibit only outward longitudinal displacement. A valve assembly 78 permits the filling of the chamber 24 with an incompressible fluid 25.

Figure 5:
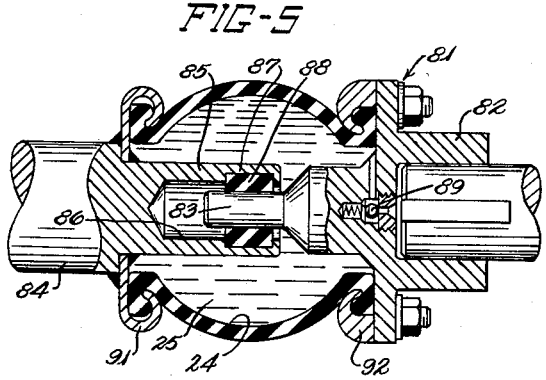
Figure 5 is a still further modified form of the flexible coupling of the invention wherein the driving and driven members on opposite sides of the flexible element are axially connected to permit relative angular and longitudinal displacement of the members while preventing relative radial displacement thereof.

A further modified form of flexible coupling designated generally by the reference numeral 81 is illustrated in Figure 5. In this embodiment, driven member 82 is provided with an axial extension, the end of which is turned down into a stub shaft 83. The driven member 84 constitutes the end portion of the output shaft and is provided with an extension 85 having an end cavity 86 with a recessed portion 87 in which is mounted a resilient bushing 88. Stub shaft 83 is slideably mounted in bushing 88 with a relatively tight-fitting connection. By virtue of this construction, relative longitudinal and angular displacement of the driving and driven members is permitted while relative radial displacement thereof is substantially prevented. A spring-biased check valve assembly 89 is incorporated in driving member 82 which is suitably bored to permit the fluid material 25 to flow therethrough to fill chamber 24. In this embodiment, hooked end fastenings 91 and 92 are welded and bolted respectively to the driven member 84 and driving member 82 to secure the ends of flexible element 18.

A further modified form of the flexible coupling of the invention is illustrated in Figure 7 and designated generally by the reference numeral 101. In this embodiment, the driven member 102 is provided with an extention 103 having an end cavity 104 therein. Slideably positioned in end cavity 104 is a resilient socket 105 adapted to tightly receive a ball 106 on the end of driven member 107. This construction also permits relative angular and longitudinal displacement of the driving and driven members, but substantially prevents relative radial displacement thereof. The end fastenings 108 and 109 for the flexible element 18 are similar to those shown in Figure 6. A spring-biased check valve assembly 111 is mounted in driving member 102 to permit the filling of chamber 24 with the incompressible fluid 25. The driving member 102 is provided with axial bore 112 and radial bore 113 to permit the flow of the incompressible fluid 25 therethrough during the filling operation. Threadedly inserted into the driving member 102 at the base of cavity 104 is a plug 114 having an orifice 115 therein which permits the free flow of the fluid 25 between cavity 104 and chamber 24 when resilient socket 105 is moved during longitudinal displacement of the driving and driven members.

As shown in Figure 7, there may be provided a non-resilient preferably metal ring 116 which extends peripherally around the flexible element 18 intermediate the ends thereof to limit the diameter thereof. This ring 116, by restricting the diameter of the flexible element, extends the longitudinal distance between the driving and driven members which permits greater angular displacement and more flexibility of operation. The ring 116 is especially desirable when the flexible element 18 is formed of resilient material.

The embodiment designated generally by the reference numeral 121 and shown in Figure 8 illustrates an adaptation of the coupling of the invention as an air spring. In this instance, the driving member 122 and the driven member 123 are connected to the flexible element 18 by means of welded, hooked end fastenings 124 and 125. Input shaft 126 and output shaft 127 are keyed to the driving member 122 and driven member 123 respectively by means of keys 128 and 129 secured by set screws 131. In this instance, the chamber 24 is almost completely filled through plug 132 with a substantially incompressible fluid 25 leaving a very small amount of air 133 remaining in the chamber 24. The amount of air is sufficiently small that it will not appreciably detract from the supporting characteristics of the incompressible fluid 25 but will provide a pneumatic cushion against sudden axial thrust of either the driven member or the driving member relative to the other.

It will be understood that the fabric reinforcing 23 described in connection with Figure 2 may be utilized with or omitted from the flexible element in any of the other embodiments. For the sake of simplicity, such fabric is illustrated only in Figure 2. It will also be understood that the various details of construction such as the end fastenings of the different illustrated modifications are merely representative of those which may be used.

The flexible coupling of this invention, as exemplified in each of the illustrated embodiments, provides an extremely simple, economical and practical torque-transmitting device. Relatively high torques may be transmitted by means of a relatively light flexible element. The use of the incompressible fluid 25 continuously to support internally the flexible element 18 in an outwardly extended position where it is most effective in transmitting torque between the rotating driving and driven members is an especially important aspect of the invention. It is essential that the fluid material 25 be substantially incompressible and that the chamber 24 be substantially completely filled therewith to insure adequate support. This provides a heavy duty coupling having maximum flexibility since a relatively thin and extremely flexible material may be used to form the element 18. It readily will be seen that an insufficiently supported flexible element will tend to twist and collapse under high torque conditions and require the use of such a heavy material that its flexibility is impaired.

The coupling of the invention will transmit a high degree of torque from an input to an output member while permitting an appreciable displacement of the members relative to one another either radially, angularly, or longitudinally. A minimum of noise is created as opposed to the high noise level inherent in such mechanical couplings as ball and socket universal joints. Further, the torque is transmitted without appreciably transferring the vibration from one member to the other and without transferring the high stress peaks which may be set up in the input shaft.

It will be understood that other forms of the flexible element 18 than that shown may be used. For example, instead of a tubular member as shown, a flexible element having the toroidal shape of an automobile tire could be placed with its axis coincident with the axis of rotation of the driving and driven members and the side walls of the toroidal element could be fixed to such members. Thus, there would be an open space resembling the hole of a doughnut axially between the driving and driven members. Further, the flexible element 18 as used in such embodiments as that of Figure 2 could be modified by extending the flexible material to close the ends of the chamber 24 in spherical configuration. Thus, the necessity for a fluid-tight connection between the flexible element and the driving and driven members would be eliminated since the chamber 24 would then lie completely inside of the generally spherical wall of the modified flexible element.

There has been illustrated and described what is considered to be the preferred embodiments of the invention. It will be understood, however, that various other modifications may be made without departing from the broader scope of the invention as embraced by the following claims.

I claim:

1. A flexible coupling comprising a rotary driving member, a rotary driven member, means connecting said members to transmit torque therebetween while permitting relative angular displacement of the axes of rotation of said members, said connecting means comprising a hollow flexible torque transmitting element extending between said members to provide a fluid tight chamber within said element, and means comprising a substantially incompressible fluid material substantially completely filling said chamber to support said flexible element against any material collapse when torque is being transmitted by said flexible element between said members.

2. A flexible coupling as recited in claim 1 wherein said chamber contains a minute quantity of gas sufficient to relieve the shock of end thrust but insufficient in amount to materially detract from the supporting characteristic of the incompressible fluid material.

3. A flexible coupling comprising a rotary driving member, a rotary driven member, means connecting said members to transmit torque therebetween while permitting relative angular displacement of the axes of rotation of said members, said connecting means comprising a hollow flexible torque transmitting element extending between said members to provide a fluid tight chamber within said element, said flexible element having embedded therein a reinforcing fabric including a plurality of cord segments extending from end to end of said flexible element in diagonally crossing relationship, and means comprising a substantially incompressible fluid material substantially completely filling said chamber to support said flexible element against any material collapse when torque is being transmitted by said flexible element between said members.

4. A flexible coupling comprising a rotary driving member, a rotary driven member, means connecting said members to transmit torque therebetween while permitting relative angular displacement of the axes of rotation of said members, said connecting means comprising a hollow flexible torque transmitting element extending between said members to provide a fluid tight chamber within said element, means connecting said members along the axis of rotation thereof substantially preventing relative radial displacement of the axes of rotation of said members while permitting relative angular displacement thereof, and means comprising a substantially incompressible fluid material substantially completely filling said chamber to support said flexible element against any material collapse when torque is being transmitted by said flexible element between said members.

5. A flexible coupling comprising a rotary driving member, a rotary driven member, means connecting said members to transmit torque therebetween while permitting relative angular displacement of the axes of rotation of said members, said connecting means comprising a tubular flexible torque transmitting element extending axially between said members to provide a fluid tight chamber within said element, and a nonstretchable ring member extending peripherally around said flexible element limiting the diameter thereof intermediate said end portions, and means comprising a substantially incompressible fluid material substantially completely filling said chamber to support said flexible element against any material collapse when torque is being transmitted by said flexible element between said members.

6. A flexible coupling comprising a rotary driving member, a rotary driven member, means connecting said members to transmit torque therebetween while permitting relative angular displacement of the axes of rotation of said members, said connecting means comprising a tubular flexible torque-transmitting element extending axially between said members to provide a fluid-tight chamber within said element, with said axes of rotation extending through said chamber, whereby relative rotation of said members tends to twist and collapse said flexible element, and means comprising a substantially incompressible fluid material substantially completely filling said chamber to support said flexible element against any material collapse when torque is being transmitted by said flexible element between said members.

7. A flexible coupling comprising a rotary driving member, a rotary driven member, means connecting said members to transmit torque therebetween while permitting relative angular displacement of the axes of rotation of said members, said connecting means comprising a hollow flexible torque-transmitting element extending between said members to provide a fluid-tight chamber within said element, means within said element between said members preventing axial separation of said members, and means comprising a substantially incompressible fluid material substantially completely filling said chamber, to support said flexible element aaginst any material collapse when torque is being transmitted by said flexible element between said members.

References Cited in the file of this patent

UNITED STATES PATENTS

| | | |
|---|---|---|
| 1,658,750 | Weiland | Feb. 7, 1928 |
| 2,185,986 | McCoy | Jan. 2, 1940 |
| 2,199,624 | Fawick | May 7, 1940 |
| 2,316,509 | Fawick | Apr. 13, 1943 |
| 2,747,386 | Ayling | May 29, 1956 |